United States Patent [19]

Kadota et al.

[11] Patent Number: 5,229,436
[45] Date of Patent: Jul. 20, 1993

[54] UNDERSEA ANTIFOULING TREATING COMPOSITION

[75] Inventors: Osamu Kadota, Toyonaka; Kouichiroh Tsurumi, Osaka; Makoto Ishimoto, Toyonaka; Yoshihiro Honda, Kawanishi, all of Japan

[73] Assignee: Nippon Oil and Fats Company, Limited, Tokyo, Japan

[21] Appl. No.: 635,507

[22] PCT Filed: May 19, 1989

[86] PCT No.: PCT/JP90/00641
§ 371 Date: Jan. 16, 1990
§ 102(e) Date: Jan. 16, 1990

[87] PCT Pub. No.: WO90/14011
PCT Pub. Date: Nov. 29, 1990

[30] Foreign Application Priority Data

May 19, 1989 [JP] Japan ................ 1-126436
Apr. 23, 1990 [JP] Japan ................ 2-107100

[51] Int. Cl.$^5$ ............................................. A61K 31/745
[52] U.S. Cl. ................................. 523/122; 424/78.09; 424/402
[58] Field of Search ............... 424/78, 78.09; 523/122

[56] References Cited

U.S. PATENT DOCUMENTS 4,111,879 9/1978 Mori et al. .................. 106/15 X
4,608,433 8/1986 Meyer et al. .................... 523/122

FOREIGN PATENT DOCUMENTS 2357623 2/1978 France .
56-34604 4/1981 Japan .
56-118006 9/1981 Japan .
58-18304 2/1983 Japan .
1-110574 4/1989 Japan ................ 523/122
573079 11/1945 United Kingdom .

OTHER PUBLICATIONS

Japan Abstract of 558/018304, Feb. 1983.
Japan Abstract 756/118006, Sep. 1981.
Japan Abstract 56/34604, Apr. 1981.
Database Japs, vol. 9, No. 166 (C-290); & JP-A-60 38 306 (Nippon Soda) Feb. 27, 1985.
Database WPIL, Accession No. 84-285352 [46], Derwent Publ. Ltd. London, GB; & JP-A-59 176 201 (Mitsui Toatsu) Oct. 5, 1984.

*Primary Examiner*—Thurman K. Page
*Assistant Examiner*—P. Kulkosky
*Attorney, Agent, or Firm*—Stevens, Davis, Miller & Mosher

[57] ABSTRACT

As an object and a use of an undersea antifouling treating composition provided by the invention, in order to prevent the adhesion of sessile organisms over a long period of time, the antifouling treating composition is immersed in fish nets for culturing, trapping and the like immersed in sea for a long time and materials such as rope and the like supporting these nets, a net for preventing invasion of jellyfishes at an intake port for cooling water, a curtain for the prevention of marine pollution used in seaside working and the like.

2 Claims, No Drawings

UNDERSEA ANTIFOULING TREATING COMPOSITION

TECHNICAL FIELD

This invention relates to a novel undersea antifouling treating composition for treating a fibrous or rope-like material to be immersed in sea.

BACKGROUND ART

Fish nets for culturing, trapping and the like immersed in sea for a long time and materials such as rope and the like supporting these nets, a net for preventing invasion of jellyfishes at an intake port for cooling water, a curtain for the prevention of marine pollution used in seaside working and the like are immersed in sea over a long period of time.

As a result, they are fouled by sessile organisms in sea to cause problems such as clogging of mesh in the net, infection of various fishes with sickness or parasite due to the decrease of flowing quantity of sea water, damage by the increase of weight, decrease of floating force and the like.

As a method of preventing the fouling through such sessile organisms, there has hitherto been widely used an undersea antifouling treating composition containing an organic tin compound such as TBT (tributyl tin compound) or the like as an effective ingredient. However, the tendency of self-control in use or the like is widening from a doubt of storing the effective ingredient in circumstance or the like.

On the other hand, as an antifouling treating composition containing no organic tin compound, there are disclosed a) a technique using a dialkylpolysulfide compound as an effective ingredient in Japanese Patent Application Publication No. 62-43962, and b) a technique on an antifouling treating composition for fish nets containing tetraalkyl thiuram disulfide, dialkylpolysulfide, 2-(thiocyanomethylthio) benzothiazole and the like as an effective ingredient in Japanese Patent laid open No. 60-38306, respectively.

Apart from the above techniques, the inventors have proposed c) a technique on an undersea antifouling treating composition containing a copolymer indicating a particular hydrophilic property and thiocyano alkylthiobenzohetrozole in Japanese Patent laid open No. 1-178562.

However, the effective antifouling performances can not be obtained only by the dialkylpolysulfide compound disclosed as the above technique a, while the tetraalkyl thiuram disulfide, dialkylpolysulfide and 2-(thiocyanmethylthio) benzothiazole disclosed as the above technique b shortly show effective antifouling performances, but it is very difficult to elute a sufficient amount of the effective ingredient from the fish net treating agent over a long period of time. Further, it has been confirmed that only the copolymer indicating the particular hydrophilic property and the thiocycno alkylthiobenzohetrozole previously proposed by the inventors as the above technique c are still insufficient to maintain the effective antifouling performances over a long period of time.

An object of the invention is to provide an undersea antifouling treating composition which can necessarily and sufficiently control the eluting rate of an antifouling agent from the fibrous or rope-like materials immersed in sea over a long period of time.

DISCLOSURE OF THE INVENTION

The inventors have made various studies in order to achieve the above object and found that dialkylpolysulfide or dialkylpolysulfide and polybutene are added as an eluting controller to an undersea antifouling treating composition comprising a particular antifouling agent and a resin as well as various film forming substances, whereby the eluting rate of the above antifouling agent can necessarily and sufficiently be controlled over a long period of time, and as a result the invention has been accomplished.

That is, the invention is concerned with a first invention on an undersea antifouling treating composition comprising the following ingredients A-C;

A) at least one of the following components A1-A5;
A1: 2-(thiocyanomethylthio) benzothiazole,
A2: tetraethylthiuram disulfide,
A3: 2,4,5,6-tetrachloro-1,3-dicyanobenzene,
A4: N-(ethylmethylphenyl)-dichloromaleimide,
A5: N-(diethylphenyl)-dichloromaleimide,
B) film forming substance;
C) at least one of dialkylpolysulfides represented by the following general formula (1);

$$R_1-(S)_n-R_2 \tag{1}$$

(wherein each of $R_1$, $R_2$ is an alkyl group having a carbon number of 1 to 20 and n is an integer of 1-5), and is preferably concerned with a second invention on an undersea antifouling treating composition comprising the above ingredients A-C and further D) polybutene having a polymerization degree of 2-100.

BEST MODE OF CARRYING OUT THE INVENTION

The ingredient A as an antifouling agent in the undersea antifouling treating composition according to the invention is at least one of 2-(thiocyanomethylthio) benzothiazole, tetraethylthiuram disulfide, 2,4,5,6-tetrachloro-1,3-dicyanobenzene, N-(ethylmethylphenyl)-dichloromaleimide and N-(diethylphenyl)-dichloromaleimide. All of these agents are well-known as an antifouling agent having a low toxicity.

As the ingredient B used as the film forming agent in the undersea antifouling treating composition according to the invention, mention may be made of natural resin for general-purpose paint, rosin, modified rosin, fatty acid, oily varnishes usually used, synthetic rubber, chlorinated rubber, polyvinyl chloride, styrene-butadiene copolymer, acrylic resin and the like. Furthermore, acrylic hydrophilic polymers synthesized by using particular hydrophilic monomers as mentioned in the following production examples are preferably used.

The ingredient C used as an eluting controller in the undersea antifouling treating composition according to the invention is at least one of dialkylpolysulfides represented by the following general formula (1);

$$R_1-(S)_n-R_2 \tag{1}$$

(wherein each of $R_1$, $R_2$ is an alkyl group having a carbon number of 1 to 20 and n is an integer of 1-5). This is generally used as a high-pressure additive for cutting oil and is a substance showing no inhibition action to organisms. As a concrete example, there are mentioned di-t-nonyl pentasulfide (specific gravity: 1.03), di-t- dodecyl pentasulfide (specific gravity: 1.55) and the like.

Further, the ingredient D used as another eluting controller in only the undersea antifouling treating composition according to the second invention is a polybutene having a polymerization degree of 2-100. This is generally used as a resin softening agent, a sizing agent or other and is a substance showing no inhibition action to organisms. As a concrete example, there are mentioned various Nissan Polybutenes (polybis) such as Polybutene 06N, Polybutene 15N (made by Nippon Oil and Fats Co., Ltd.) and so on.

As the amount of each ingredient used in the undersea antifouling treating composition according to the invention, the ratio occupied in the treating composition is 0.3-60% by weight, preferably 0.5-50% by weight in the ingredient A, 3-60% by weight, preferably 5-30% by weight in the ingredient B and 1-30% by weight, preferably 2-25% by weight in the ingredient C, and further 1-30% by weight, preferably 2-25% by weight in the ingredient D in the treating composition of the second invention.

When the amount of the ingredient A is less than the above value, the antifouling property is lacking, while when it is too large, the formation of the coating is difficult. When the amount of the ingredient B is too small, the formation of the coating is difficult, while when it is too large, the antifouling property is lacking and the function of eluting control lowers. When the amount of the ingredient C is too small, the function of eluting control lowers, while when it is too large, the function of eluting control also lowers and the formation of the coating is difficult. When the amount of the ingredient D is too large, the function of eluting control lowers and the formation of the coating is difficult.

In the undersea antifouling treating composition according to the invention, various additives such as organic solvent, other antifouling agent, colorant, thixotropic agent, antifoaming agent, thickening agent, plasticizer and the like may be added, if necessary, in addition to the above ingredients A-D.

As the organic solvent, toluene, xylene, solvent naphtha, pseudocumene, acetone, methyl ethyl ketone, methyl isobutyl ketone, ethyl acetate, butyl acetate, ethyl cellosolve, butyl cellosolve and the like may be used alone or in admixture thereof.

In order to improve the antifouling property, the other antifouling agent such as N-t-butyl-N'-cyclopropyl-6-(methylthio)-1,3,5-triazine-2,4-diamine, 3-(3,4-dichlorophenyl)-1,1-dimethylurea, N,N-dimethyl-N'-phenyl-N'-(fluorodichloromethylthio) sulfamide, N,N-dimethyl-N'-tolyl-N'-(fluorodichloromethylthio) sulfamide, N-(fluorodichloromethylthio) phthalimide, cuprous oxide, organotin compound, zinc dimethyldithiocarbamate, copper diethyldithocarbamate and the like may be added within a range of damaging no effect of the invention.

The undersea antifouling treating composition comprising the ingredients A-C or the ingredients A-D according to the invention is usually prepared by dissolving the above ingredients in an organic solvent by means of a dissolver or the like. The prepared undersea antifouling treating composition is immersed in a material to be treated.

The invention will be concretely described with reference to production examples, examples, and comparative examples. In the examples, part and % are by weight.

PRODUCTION EXAMPLES 1-3

Into a flask provided with a stirrer were charged solvent 1, unit B1, unit B2 and catalyst 1 according to a compounding recipe shown in Table 1, and temperature was raised to 100° C. for 30 minutes with stirring and further the stirring was continued at the same temperature for 2 hours. Then, a mixed solution of additional solvent 2 and catalyst 2 was added dropwise over 1 hour, and the stirring was continued at 105° C. for 2 hours and at 120° C. for 1 hour.

Finally, a diluent was added and homogenized to obtain each of three transparent hydrophilic copolymer solutions. The solid content, viscosity and molecular weight of the polymer solution were shown in Table 1.

TABLE 1

|  |  | Production Example 1 | Production Example 2 | Production Example 3 |
|---|---|---|---|---|
| Solvent 1 | xylene | 60 | 60 | 60 |
| Unit B1 | ethoxypentadecaethylene glycol methacrylate | 10 | | |
|  | methoxytricosaethylene glycol methacrylate | 5 | | 2 |
|  | 2-methoxyethyl acrylate | | | 3 |
|  | propioxytetradiethylene glycol methacrylate | | 21.5 | |
|  | 2-acetoxyethyl acrylate | | 21.4 | |
| Unit B2 | methyl methacrylate | 35 | 30 | 50 |
|  | methyl n-butyl methacrylate | 50 | 22.1 | |
|  | 2-ethylhexyl acrylate | | | 45 |
|  | styrene | | 5 | |
| Catalyst 1 | t-butylperoxy-2-ethylhexanoate | 1.5 | | |
|  | benzoyl peroxide | | 1.5 | 1.5 |
| Catalyst 2 | t-butylperoxy-2-ethyl hexanoate | 0.5 | | |
|  | benzoyl peroxide | | 1.5 | 1.5 |
| Solvent 2 | xylene | 20 | 20 | 20 |
| Diluent | xylene | 20 | 20 | 20 |
| Property value | viscosity (poise/20 degree) | 1.3 | 1.0 | 1.2 |
|  | solid content (weight %) | 62.0 | 49.2 | 48.8 |
|  | weight average molecular weight | 73,000 | 23,000 | 28,000 |

Examples 1-18 and Comparative Examples 1-26

Preparation of undersea antifouling treating composition

Various treating compositions of Examples and Comparative Examples were prepared by charging all ingredients into a beaker according to a compounding recipe shown in Table 2 and stirring and dissolving them by means of a dissolver.

TABLE 2(1)

| | Example | | | | | | | | | | | | | | | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 |
| Production Example 1 | 24.2 | | | | | | 24.2 | 24.2 | 24.2 | 24.2 | 8.0 | | | 8.0 | | | 20.0 | |
| Production Example 2 | | 30.0 | | | | | | | | | | 61.0 | | | 20.0 | | | 61.0 |
| Production Example 3 | | | 30.0 | | | | | | | | | | 40.0 | | | 40.0 | | |
| Acrylic resin | | | | 15.0 | | | | | | | | | | | | | | |
| Vinyl chloride | | | | | 15.0 | | | | | | | | | | | | | |
| Chlorinated rubber | | | | | | 15.0 | | | | | | | | | | | | |
| TCMTB | 10.0 | 10.0 | 10.0 | 10.0 | 10.0 | 10.0 | | | | | 0.5 | 10.0 | 1.5 | 0.5 | | 2.0 | | 10.0 |
| TET | | | | | | | 10.0 | | | | 30.0 | 1.0 | 10.0 | | 50.0 | | | |
| TCDCB | | | | | | | | 10.0 | | | | | | | 5.0 | | | |
| EMDCM | | | | | | | | | 10.0 | | | | | | | 10.0 | | |
| DEDCM | | | | | | | | | | 10.0 | | | | | | | 12.0 | |
| TNPS | 5.0 | 5.0 | 5.0 | 5.0 | 5.0 | 5.0 | 5.0 | 5.0 | 5.0 | 5.0 | 25.0 | | 10.0 | 5.0 | 2.0 | 25.0 | 5.0 | |
| TDPS | | | | | | | | | | | | 2.0 | | | | | | 10.0 |
| PBO6N | 5.0 | 5.0 | 5.0 | 5.0 | 5.0 | 5.0 | 5.0 | 5.0 | 5.0 | 5.0 | | | 5.0 | 2.0 | 5.0 | 25.0 | 5.0 | 5.0 |
| xylene | 55.8 | 50.0 | 50.0 | 65.0 | 65.0 | 65.0 | 55.8 | 55.8 | 55.8 | 55.8 | 36.5 | 26.0 | 38.5 | 81.5 | 21.0 | 18.0 | 38.0 | 14.0 |
| | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |

TABLE 2(2)

| | Comparative Example | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Production Example 1 | 4.0 | 24.2 | 24.2 | | 24.2 | 24.2 | | 24.2 | 24.2 | | 24.2 | 24.2 | 24.2 | 24.2 | 24.2 |
| Production Example 2 | | | | 10.0 | | | | | | | | | | | |
| Production Example 3 | | | | | | | 10.0 | | | | | | | | |
| Acrylic resin | | | | | | | | | | | | | | | |
| Vinyl chloride | | | | | | | | | | | | | | | |
| Chlorinated rubber | | | | | | | | | | 65.0 | | | | | |
| TCMTB | 0.5 | 10.0 | 10.0 | | | | | | | | | | | | |
| TET | | | | 0.1 | 10.0 | 10.0 | | | | | | | 65.0 | | |
| TCDCB | | | | | | | 0.5 | 10.0 | 10.0 | | | | | | |
| EMDCM | | | | | | | | | | 2.0 | 10.0 | 10.0 | | | |
| DEDCM | | | | | | | | | | | | | | 10.0 | 10.0 |
| TNPS | 25.0 | | | 25.0 | | | 40.0 | | | | | | | | |
| PBO6N | | 10.0 | | | 10.0 | | | 10.0 | | | 10.0 | | | 10.0 | |
| xylene | 70.5 | 55.8 | 65.8 | 64.9 | 55.8 | 65.8 | 49.5 | 55.8 | 65.8 | 33.0 | 55.8 | 65.8 | 10.8 | 55.8 | 65.8 |
| | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |

TABLE 2(3)

| | Comparative Example | | | | | | | | | | |
|---|---|---|---|---|---|---|---|---|---|---|---|
| | 16 | 17 | 18 | 19 | 20 | 21 | 22 | 23 | 24 | 25 | 26 |
| Production Example 1 | 4.0 | | | | | 24.2 | | 24.2 | 24.2 | | |
| Production Example 2 | | 20.0 | | 5.0 | 10.0 | | | | | | |
| Production Example 3 | | | 20.0 | | | | 20.0 | | | | |
| Acrylic resin | | | | | | | | | | 65.0 | |
| Vinyl chloride | | | | | | | | | | | 65.0 |
| Chlorinated rubber | | | | | | | | | | | |
| TCMTB | | 0.1 | | | | | | | | | |
| TET | | | | 65.0 | 0.5 | 65.0 | | | | | |
| TCDCB | | | | | 0.1 | | 50.0 | 10.0 | 10.0 | | |
| EMDCM | | | | | | | | | | 2.0 | 2.0 |
| DEDCM | 10.0 | | | | | | | | | | |
| TNPS | | | | 10.0 | 10.0 | 10.0 | 2.0 | 0.5 | 40.0 | 10.0 | 10.0 |
| PBO6N | | | | 10.0 | 10.0 | 2.0 | 2.0 | 10.0 | 40.0 | 10.0 | |
| xylene | 86.0 | 79.9 | 5.0 | 74.5 | 69.9 | 6.8 | 27.5 | 15.8 | 15.8 | 13.0 | 23.0 |
| | 100.0 | 100.0 | 100.0 | 100.0 | 100.0 | 100.0 | 100.0 | 100.0 | 100.0 | 100.0 | 100.0 |

(Note)

| resin | solid content in resin % | trade name | |
|---|---|---|---|
| Acrylic resin | 100.0 | Hitaloid 1641A | made by Hitachi Chemical Industries, Ltd. |
| Vinyl chloride | 100.0 | Eslec C | made by Sekisui Chemical Co., Ltd. |
| Chlorinated rubber | 100.0 | Aroprene R20 | made by Imperial Chemical Industries, Ltd. |

TABLE 2(3)-continued

| | | Comparative Example | | | | | | | | | | |
|---|---|---|---|---|---|---|---|---|---|---|---|
| | | 16 | 17 | 18 | 19 | 20 | 21 | 22 | 23 | 24 | 25 | 26 |

| Reagent | substance name | |
|---|---|---|
| TCMTB | 2-(thiocyanomethylthio)benzothiazole | made by Permachem Asia Kabushiki Kaisha |
| TET | tetraethylthiuram disulfide | made by Sanshin Kagaku Kogyo Kabushiki Kaisha |
| TCDCB | 2,4,5,6-tetrachloro-1,3-dicyanobenzene | made by Sannobuko Kabushiki Kaisha |
| EMDCM | N-(ethylmethylphenyl)-dichloromaleimide | made by Nippon Oil and Fats Co., Ltd. |
| DEDCM | N-(diethylphenyl)-dichloromaleimide | made by Nippon Oil and Fats Co., Ltd. |

The test for antifouling property through immersion in sea and the measurement on an amount of antifouling agent eluted were made with respect to the above prepared treating compositions of examples and Comparative Examples. The results were shown in Table 3.

Test for antifouling property

A specimen of 20 cm in width and 40 cm in length cut out from a polyethylene fish net for culture fishpond (32 nets, 6 knots) was immersed in each of the undersea antifouling treating compositions of Examples and Comparative examples and then dried in air for 48 hours. The fish net treated by the above method was immersed at a position of 1.5 m beneath water surface in Aioi port of Hyogo prefecture, and then the fouled state through sessile organisms was examined over 6 months. The results of the test for antifouling property were evaluated at the following five stages.

5: no fouling of sessile organisms.

4: area of sessile organisms fouled to the fish net is less than 5%.

3: area of sessile organisms fouled to the fish net is not less than 5% but less than 15%.

2: area of sessile organisms fouled to the fish net is not less than 15% but less than 50%.

1: area of sessile organisms fouled to the fish net is not less than 50%.

Amount of antifouling agent eluted

The same fish net as used in the test for antifouling property was impregnated with the treating composition in the same manner and immersed in sea. After 6 months, the fish net was taken out from sea and placed in a beaker containing 1 liter of sea water for 1 hour to elute the antifouling agent. The sea water containing the eluted antifouling agent was analyzed by a liquid chromatography to measure the amount of the antifouling agent eluted. The eluted amount was indicated as a concentration of the antifouling agent eluted in 1 liter of sea water (ppm).

TABLE 3

| | Test result of antifouling property | | | Amount of antifouling agent eluted (ppm) | | | | |
|---|---|---|---|---|---|---|---|---|
| | 1 month | 3 months | 5 months | TCMTB | PET | TCDCB | BMDCM | DEDCM |
| Example | | | | | | | | |
| 1 | 5 | 5 | 5 | 0.15 | | | | |
| 2 | 5 | 5 | 4 | 0.12 | | | | |
| 3 | 5 | 5 | 5 | 0.14 | | | | |
| 4 | 5 | 4 | 3 | 0.09 | | | | |
| 5 | 5 | 4 | 3 | 0.10 | | | | |
| 6 | 5 | 4 | 4 | 0.12 | | | | |
| 7 | 5 | 4 | 3 | | 0.09 | | | |
| 8 | 5 | 4 | 3 | | | 0.09 | | |
| 9 | 5 | 4 | 4 | | | | 0.10 | |
| 10 | 5 | 4 | 4 | | | | | 0.09 |
| 11 | 5 | 4 | 3 | 0.09 | 0.09 | | | |
| 12 | 5 | 3 | 4 | 0.15 | 0.07 | | | |
| 13 | 5 | 3 | 3 | 0.12 | 0.09 | | | |
| 14 | 5 | 5 | 4 | 0.09 | | | | |
| 15 | 5 | 5 | 4 | | 0.10 | 0.10 | | |
| 16 | 5 | 4 | 5 | 0.13 | | | 0.11 | |
| 17 | 5 | 5 | 4 | | | | | 0.10 |
| 18 | 5 | 4 | 5 | 0.15 | | | | |
| Comparative Example | | | | | | | | |
| 1 | 3 | 2 | 1 | 0 | | | | |
| 2 | 5 | 2 | 1 | 0.01 | | | | |
| 3 | 3 | 1 | 1 | 0 | | | | |
| 4 | 1 | 1 | 1 | | 0.01 | | | |
| 5 | 5 | 3 | 1 | | 0 | | | |
| 6 | 3 | 1 | 1 | | 0 | | | |
| 7 | 2 | 1 | 1 | | | 0 | | |
| 8 | 5 | 3 | 1 | | | 0.01 | | |
| 9 | 2 | 1 | 1 | | | 0 | | |
| 10 | 1 | 1 | 1 | | | | 0 | |
| 11 | 5 | 4 | 2 | | | | 0.03 | |
| 12 | 3 | 1 | 1 | | | | | 0 |

TABLE 3-continued

| | Test result of antifouling property | | | Amount of antifouling agent eluted (ppm) | | | | |
|---|---|---|---|---|---|---|---|---|
| | 1 month | 3 months | 5 months | TCMTB | PET | TCDCB | BMDCM | DEDCM |
| 13 | 5 | 1 | 1 | | | | | 0.02 |
| 14 | 5 | 3 | 1 | | | | | 0.01 |
| 15 | 3 | 1 | 1 | | | | | 0 |
| 16 | 4 | 1 | 1 | | | | | 0.01 |
| 17 | 2 | 1 | 1 | 0 | | | | |
| 18 | 5 | 1 | 1 | | 0 | | | |
| 19 | 2 | 1 | 1 | | 0 | | | |
| 20 | 1 | 1 | 1 | | | 0 | | |
| 21 | 5 | 1 | 1 | | 0 | | | |
| 22 | 5 | 4 | 1 | | | 0 | | |
| 23 | 5 | 2 | 1 | | | 0 | | |
| 24 | 5 | 2 | 1 | | | 0 | | |
| 25 | 2 | 1 | 1 | | | | 0 | |
| 26 | 1 | 1 | 1 | | | | 0 | |

As seen from Table 3, in Examples 1-10, 14-18 being the undersea antifouling treating compositions according to the second invention, no fouling of sessile organisms was observed even in the test for antifouling property for 6 months, and the eluted amount of the antifouling agent of 0.09 ppm was maintained even after 6 months.

In Examples 11-13 being the undersea antifouling treating compositions according to the first invention, the antifouling property was slightly poor as compared with the second invention, but the adhesion of sessile organisms in the test for antifouling property was slight over a long period of 6 months and the eluted amount of the antifouling agent of 0.07 ppm was maintained after 6 months.

On the other hand, in the comparative examples, the remarkable fouling of sessile organisms is observed and the eluted amount of the antifouling agent after 6 months clearly decreases, from which it is clear that the undersea antifouling treating composition according to the invention is excellent.

INDUSTRIAL APPLICABILITY

In the fibrous or rope-like materials treated with the undersea antifouling treating agent containing the ingredient C or further the ingredient D according to the invention and immersed in sea, the eluting rate of the ingredient A as an antifouling agent is adequately controlled, so that the antifouling effect can be maintained over a long period of time, which has never been attained in the conventional technique.

We claim:

1. An undersea antifouling treating composition comprising:
   A) 0.3 to 60% by weight of at least one antifouling agent selected from the group consisting of:
   2-([thiocycanomethylthio]thiocyanomethylthio) benzothiazole, N-(ethylmethylphenyl)-dichloromaleimide, and N-(diethylphenyl)-dichloromaleimide;
   B) 0.3 to 60% by weight of a film forming substance; and
   C) 1 to 30% by weight of at least one dialkylpolysulfide represented by formula (1:

$$R_1—(S)_n—R_2 \qquad (1)$$

(wherein each of $R_1$ and $R_2$ is alkyl having a carbon number of 1 to 20 and n is an integer of 1-5).

2. An undersea antifouling treating composition according to claim 1, further comprising:
   D) 1 to 30% by weight of polybutene having a polymerization degree of 2-100.

* * * * *